(12) United States Patent
Mankame et al.

(10) Patent No.: US 7,478,845 B2
(45) Date of Patent: Jan. 20, 2009

(54) ACTIVE MATERIALS BASED APPROACHES TO LATCH SNUG DOWN AND ARTICLES CONTAINING THE SAME

(75) Inventors: Nilesh D. Mankame, Ann Arbor, MI (US); Alan L. Browne, Grosse Pointe, MI (US); Paul R. Meernik, Redford, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 119 days.

(21) Appl. No.: 11/078,823

(22) Filed: Mar. 11, 2005

(65) Prior Publication Data

US 2005/0206175 A1 Sep. 22, 2005

Related U.S. Application Data

(60) Provisional application No. 60/552,791, filed on Mar. 12, 2004.

(51) Int. Cl.
*E05C 15/02* (2006.01)
(52) U.S. Cl. .................................. 292/201; 292/341.16
(58) Field of Classification Search ................. 292/144, 292/201, 341.16
See application file for complete search history.

(56) References Cited

U.S. PATENT DOCUMENTS

| | | | |
|---|---|---|---|
| 2,811,136 A | 10/1957 | Westcott, Jr. et al. | 91/44 |
| 2,856,200 A | 10/1958 | Conflitti | 280/5.513 |
| 2,973,969 A | 3/1961 | Thall | 280/5.517 |
| 3,695,144 A | 10/1972 | Goiffon et al. | 91/41 |
| 4,351,515 A | 9/1982 | Yoshida | 267/225 |
| 4,655,629 A | 4/1987 | Flaherty | 403/291 |
| 4,773,680 A | 9/1988 | Krumme | 285/381.2 |
| 4,828,237 A | 5/1989 | Neff | 267/221 |
| 5,018,606 A | 5/1991 | Carlson | 188/267.1 |
| 5,070,697 A | 12/1991 | Van Zeggeren | 60/527 |
| 5,095,595 A * | 3/1992 | Stella et al. | 24/603 |
| 5,277,281 A | 1/1994 | Carlson et al. | 188/267 |
| 5,396,769 A * | 3/1995 | Brudnicki | 60/528 |
| 5,398,916 A | 3/1995 | Kramer et al. | 267/70 |
| 5,468,042 A | 11/1995 | Heinrichs et al. | 296/246.4 |
| 5,492,312 A | 2/1996 | Carlson | 267/140.14 |
| 5,592,780 A | 1/1997 | Checkovich | 49/386 |
| 5,657,969 A | 8/1997 | Bivens | 267/64.12 |
| 5,687,958 A | 11/1997 | Renz et al. | 267/136 |
| 5,727,391 A | 3/1998 | Hayward et al. | 60/528 |
| 5,741,007 A | 4/1998 | Witt | 267/64.12 |

(Continued)

FOREIGN PATENT DOCUMENTS

WO WO2004/001170 A1 12/2003

*Primary Examiner*—Gary Estremsky (57) ABSTRACT

Disclosed herein is a locking device comprising a striker; and a latch in operative communication with an actuator that comprises an active material; wherein the latch is adapted to engage the striker in direct proportion to an applied activation signal. Disclosed herein too is a method for assisting a final closing motion of a suspended body with respect to a supporting body comprising moving the suspended body to within a defined distance from the supporting body; and activating a locking device, wherein the locking device comprises a striker; a latch in operative communication with an actuator that comprises an active material; wherein the latch is adapted to engage the striker in direct proportion to an applied activation signal.

16 Claims, 6 Drawing Sheets

U.S. PATENT DOCUMENTS

| | | | |
|---|---|---|---|
| 5,839,719 A | 11/1998 | Hosan et al. | 267/64.12 |
| 5,967,268 A | 10/1999 | De Molina et al. | 188/277 |
| 6,008,992 A * | 12/1999 | Kawakami | 361/726 |
| 6,126,371 A | 10/2000 | McCloskey | 411/82.5 |
| 6,371,463 B1 | 4/2002 | Sorovshian | 267/158 |
| 6,374,608 B1 * | 4/2002 | Corris et al. | 60/528 |
| 6,382,602 B1 | 5/2002 | Morrow | 267/64.23 |
| 6,427,813 B1 | 8/2002 | Carlson | 188/267.2 |
| 6,491,291 B1 | 12/2002 | Keeney et al. | 267/190 |
| 6,508,437 B1 | 1/2003 | Davis et al. | 244/173.2 |
| 6,615,449 B1 | 9/2003 | Alvarez | 16/66 |
| 6,641,184 B2 * | 11/2003 | Erices et al. | 292/216 |
| 6,666,483 B2 * | 12/2003 | Baniak et al. | 292/123 |
| 6,715,591 B2 | 4/2004 | Davis | 188/268 |
| 6,832,539 B2 | 12/2004 | Colby | 92/14 |
| 6,848,727 B1 * | 2/2005 | Cetnar et al. | 292/201 |
| 6,871,519 B2 * | 3/2005 | Butera et al. | 70/256 |
| 6,886,837 B2 | 5/2005 | Gibbs | 280/43.17 |
| 6,920,966 B2 | 7/2005 | Buchele et al. | 188/300 |
| 7,029,044 B2 | 4/2006 | Browne et al. | 293/137 |
| 7,111,359 B1 | 9/2006 | Luca | 16/66 |
| 2002/0074742 A1 | 6/2002 | Quoiani | 277/627 |
| 2002/0185347 A1 | 12/2002 | Pohl et al. | 188/267.1 |
| 2004/0194970 A1 | 10/2004 | Eatwell et al. | 166/387 |
| 2004/0231933 A1 | 11/2004 | Buchele et al. | 188/267 |
| 2005/0072579 A1 | 4/2005 | Gambier | 166/387 |
| 2005/0199455 A1 | 9/2005 | Browne et al. | 188/266.4 |
| 2005/0205364 A1 | 9/2005 | Browne et al. | 188/31 |
| 2005/0206095 A1 | 9/2005 | Keefe et al. | 277/628 |
| 2005/0206175 A1 | 9/2005 | Browne et al. | 292/253 |
| 2005/0230195 A1 | 10/2005 | Jones et al. | 188/68 |
| 2005/0263359 A1 | 12/2005 | Mankame et al. | 188/266.1 |

* cited by examiner

ACTIVE MATERIALS BASED APPROACHES TO LATCH SNUG DOWN AND ARTICLES CONTAINING THE SAME

CROSS-REFERENCE TO RELATED APPLICATIONS

This application claims the benefit of U.S. Provisional Application Ser. No. 60/552,791 filed Mar. 12, 2004, the entire contents of which are hereby incorporated by reference.

BACKGROUND

This disclosure relates to active materials based approaches to achieving latch snug-down and articles containing the same.

In many vehicles, the process of closing a suspended body (e.g. door, hatch, hood or the like) takes place in two steps. The first step involves establishing a mechanical "interlock" between the suspended body and the supporting body (e.g., vehicle frame). This interlock ensures that suspended body cannot be separated from the body unintentionally.

Figure 1:
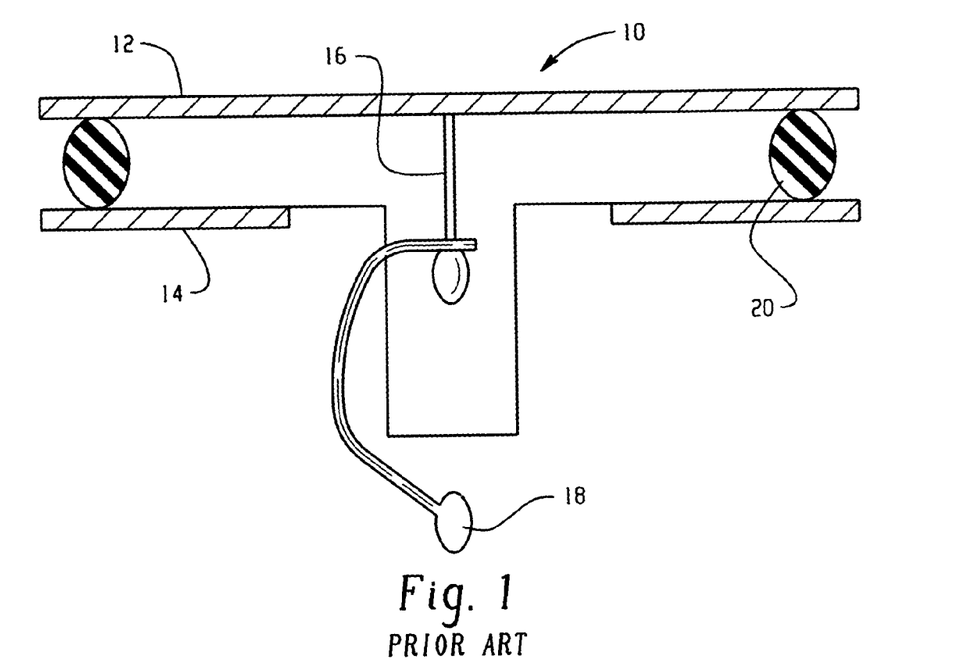
FIG. 1 is an exemplary enclosure 10 wherein the process of interlocking the suspended body 12 to the supporting body 14 involves a striker 16 engaging a rotary latch 18.

As can be seen in the FIG. 1, in an exemplary vehicle enclosure 10 the process of interlocking the suspended body 12 to the supporting body 14 generally takes the form of a striker 16 engaging a rotary latch 18. The interlock during this first step is generally designed to require low to moderate user effort.

Figure 2:
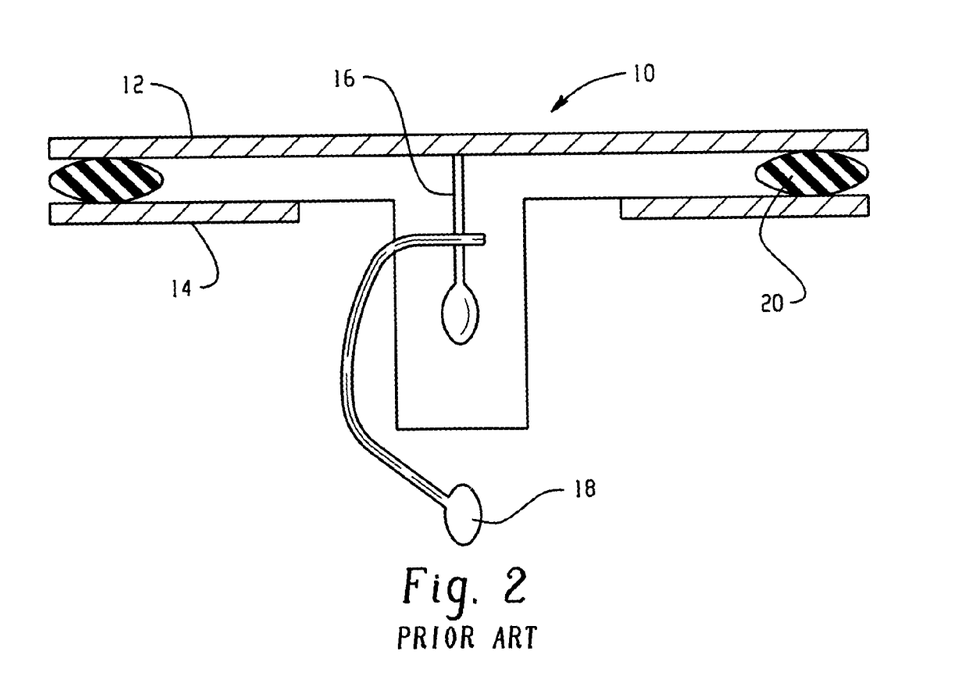
FIG. 2 depicts the exemplary vehicle enclosure 10 during the second step in the closing process, which involves drawing the suspended body 12 closer towards the supporting body 14 against the resistance offered by the seals 20 interposed between the suspended body 12 and the supporting body 14.

As depicted in the FIG. 2, the second step in the closing process involves drawing the suspended body 12 closer towards the supporting body 14 against the resistance offered by the seals 20 interposed between the suspended body 12 and the supporting body 14. This step is known as a "latch snug-down" and is usually assisted and/or accomplished by an actuator or motor (not shown). The seals 20 get compressed during snug-down, thereby enhancing the sealing action. A better sealing action ensures that the communication of undesirable factors (e.g., wind noise, elements of the weather, dust, or the like) to the vehicle interior is attenuated, thus leading to a higher perceived quality of vehicle performance.

The two step closing process is used to eliminate the trade-off imposed on closure (e.g. door, hatch, trunk, etc.) design by the competing objectives of reducing the closing effort and achieving good sealing.

SUMMARY

Disclosed herein is a locking device comprising a striker; and a latch in operative communication with an actuator that comprises an active material; wherein the latch is adapted to engage the striker in direct proportion to an applied activation signal.

Disclosed herein too is a method for assisting a final closing motion of a suspended body with respect to a supporting body comprising moving the suspended body to within a defined distance from the supporting body; and activating a locking device, wherein the locking device comprises a striker; a latch in operative communication with an actuator that comprises an active material; wherein the latch is adapted to engage the striker in direct proportion to an applied activation signal.

DETAILED DESCRIPTION OF FIGURES

DETAILED DESCRIPTION

Disclosed herein are active material based approaches that can be used to achieve latch snug down between the suspended body and the supporting body in an enclosure. Enclosures that utilize active materials to facilitate snug down are lighter, less bulky, quieter, and more reliable that other systems that employ motors to accomplish latch snug-down between the suspended body and the supporting body in an enclosure. The locking device is advantageous in providing assistance in the final closing motion of a suspended body with respect to a supporting body. In one advantageous embodiment, the locking device is advantageous in providing assistance in the final closing motion of a door with respect to a door frame.

Figure 3:
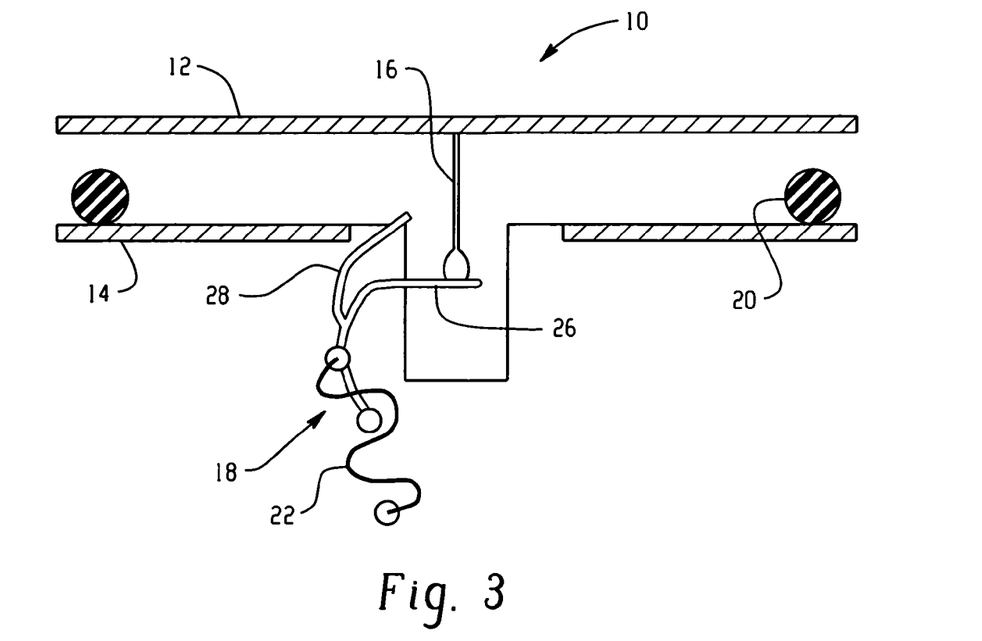
FIG. 3 is a depiction of the position of the suspended body 12 relative to the supporting body 14 just before interlocking occurs.
Figure 4:
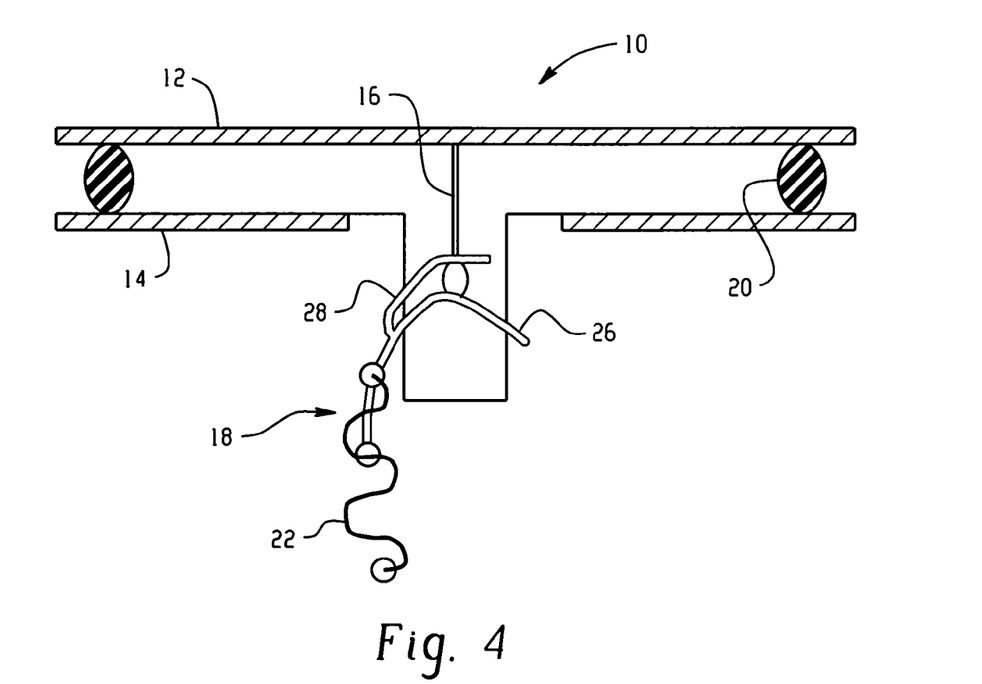
FIG. 4 is a depiction of one exemplary embodiment of the upper finger 28 engaging the striker 16 as a result of the closing effort exerted by the user. The bias spring holds the striker and latch in this position after the position is achieved. The closing effort has to do work on the spring to move it past its neutral stability position to get it to the above position.
Figure 5:
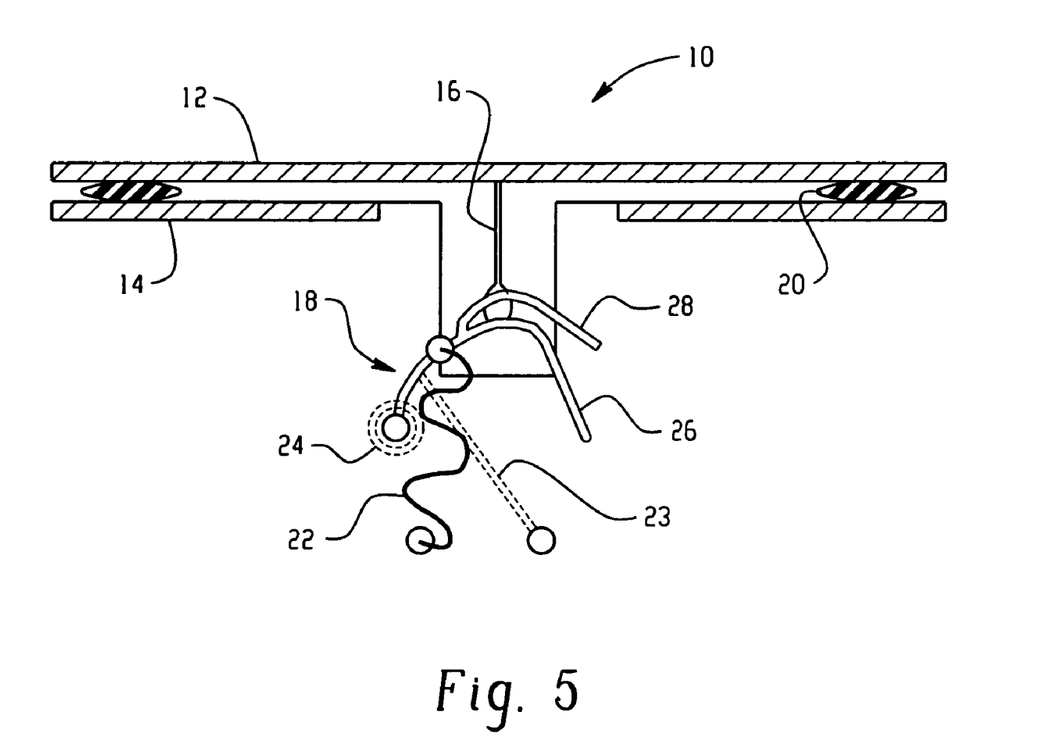
FIG. 5 is a depiction of one exemplary embodiment of a latch body that employs an active material as a linear actuator 23 or a rotary actuator 24 to achieve latch snug-down.

FIGS. 3 through 5 depict an exemplary embodiment of one method of accomplishing a latch snug down in an enclosure 10 when active materials are deployed. FIG. 3 is a depiction of the position of the suspended body 12 relative to the supporting body 14 just before interlocking occurs. From FIG. 3, it can be seen that the striker 16 that is affixed to the suspended body 12 is about to contact the lower finger 26 of the latch body. The latch body 18 comprises a lower finger 26 and an upper finger 28. The latch body is in operative communication with a bias spring 22.

The spring 22 has two stable positions, and it resists any movement of the latch body that serves to move the spring away from its stable positions. Before the closing effort exerted by the user causes the striker to engage the latch body such that a mechanical interlock is established between 12 and 14, the spring 22 has a stable position that corresponds to the configuration shown in the FIG. 3. In this configuration, the spring serves to hold the latch body in a position that is suitable for initiation of the process that establishes a mechanical interlock between the striker 16 and the latch body 18. The second stable position of the bias spring corresponds to the configuration shown in the FIG. 4, where the mechanical interlock process has been completed.

The closing effort exerted by the user to establish the mechanical interlock, does work on the spring and moves it from its first stable position past a neutral equilibrium position to its second equilibrium position. At the point of contact of the latch 26 with the striker 16, the bias spring 22 keeps the latch in its open position, in which condition it is ready to receive the striker 16 as shown in the FIG. 3.

The latch body therefore has three stable positions. The first position is depicted in the FIG. 3, where there is no contact between the striker 16 and the latch body 18. The second position is depicted in FIG. 4, where the mechanical interlocking is complete but no seal compression has occurred. In the third position, the latch snug down occurs, and the seals are compressed to the desired extent.

As the suspended body 12 is drawn towards to supporting body 14 (in order to accomplish closure), the striker 16 presses downwards on the lower finger 26 of the latch against the restoring force exerted by the biasing spring 22. This causes the latch to rotate in the clockwise direction and the upper finger 28 of the latch engages the striker 16 as shown in FIG. 4.

When the latch body has moved past the neutral equilibrium position for the spring 22 and has engaged with the striker 16, the force exerted by the bias spring 22 rotates the latch body further in the clockwise direction. This ensures that the mechanical interlock established between the latch body and the striker cannot be unintentionally undone. Due to the shape of the latch body fingers, a further clockwise rotation of the latch body beyond the configuration shown in FIG. 4 requires that the striker, and hence the suspended body 12, be pulled closer towards the supporting body 14. However, this motion is resisted by the seals 20, which need to be compressed if the two bodies 12 and 14 are to be pulled closer. The bias spring 22 is capable of exerting enough force to keep the latch in the open position prior to the interlocking and keeping the latch in the semi-closed position after the snug down process (as shown in FIG. 4). In the semi-closed condition, the latch is mechanically interlocked with the striker 16 and hence, the suspended body 12 cannot be unintentionally separated from the supporting body 14. The latch snug-down step can be accomplished by using an active material based linear actuator 23 or rotary actuator 24 such as those indicated schematically in FIG. 5. The latch snug down involves compressing the seals and further rotating the latch (clockwise) to its fully-closed position. The latch is typically held in this position by an electromechanical interlock. Exemplary electromechanical locks are pull-pins, ratchets, or the like.

Exemplary linear actuators 23 depicted by the dashed line shown in FIG. 5 can be shape memory alloy wires, strips, springs or the like, electroactive polymer elements, or the like. Exemplary rotary actuators 24 depicted by a dashed circle in the FIG. 5 can include shape memory alloy wires wrapped around a spindle or pulleys, shape memory alloy torque tubes, electroactive polymer bundles, or the like. As shown in the FIG. 5, these actuators are in direct operative communication with the latch. Direct operative communication is that wherein the at least one surface of the actuator contacts at least one surface of the latch body. In an alternative embodiment, the actuators can be in indirect operative communication via a transmission mechanism (e.g., a gear train, a worm wheel, a rack and pinion, flexible mechanism, or the like) that modifies the force and/or displacement characteristics of the actuator to better match the latch characteristics. In yet another embodiment, the actuators may be in direct operative communication with the suspended body 12 instead of driving the suspended body 12 via the latch-striker interlock. Combinations of these approaches are also possible.

Active materials suitable for use as actuators in the embodiments described herein, for purposes of discussion, may be grouped into two functional categories. The first of these two categories of active materials is that of shape memory materials, these being materials or compositions that have the ability to remember their original shape, which can subsequently be recalled by applying an external stimulus, i.e., an activation signal. Exemplary shape memory materials suitable for use in the present disclosure include shape memory alloys, ferromagnetic shape memory alloys, shape memory polymers and composites of the foregoing shape memory materials with non-shape memory materials, and combinations comprising at least one of the foregoing shape memory materials. The second category of active materials suitable for use in the latch snug down assembly are those that change their shape in proportion to the strength of the applied field but then return to their original shape upon the discontinuation of the field. Exemplary active materials in this category are electroactive polymers (dielectric polymers), piezoelectrics, and piezoceramics. Activation signals can employ an electrical stimulus, a magnetic stimulus, a chemical stimulus, a mechanical stimulus, a thermal stimulus, or a combination comprising at least one of the foregoing stimuli.

For convenience and by way of example, reference herein will be made to shape memory alloys. An exemplary active material is a shape memory alloy. Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their elastic modulus, yield strength, and shape orientation are altered as a function of temperature. Generally, in the low temperature, or martensite phase, shape memory alloys can be seemingly plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys can exhibit a one-way shape memory effect, an intrinsic two-way effect, or an extrinsic two-way shape memory effect. Annealed shape memory alloys generally exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating.

Intrinsic two-way shape memory alloys are characterized by a shape transition both upon heating from the martensite phase to the austenite phase, as well as an additional shape transition upon cooling from the austenite phase back to the martensite phase. In contrast, active connector elements that exhibit the extrinsic two-way shape memory effects are composite or multi-component materials that combine a shape memory alloy composition that exhibits a one-way effect with another element that provides a restoring force to return the first plate another position or to its original position. Active elements that exhibit an intrinsic one-way shape memory effect are fabricated from a shape memory alloy composition that will cause the active elements to automatically reform themselves as a result of the above noted phase transformations. Intrinsic two-way shape memory behavior must be induced in the shape memory material through thermo-mechanical processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a few degrees depending on the alloy composition.

Suitable shape memory alloy materials for fabricating the active elements include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, or the like, or a combination comprising at least one of the foregoing shape memory alloys. The alloys can be binary, ternary, or any higher order so long as the alloy composition exhibits a shape memory effect, e.g., change in shape orientation, changes in yield strength, and/or flexural modulus properties, damping capacity, and the like.

The thermal activation signal may be applied to the shape memory alloy in various ways. It is generally desirable for the thermal activation signal to promote a change in the temperature of the shape memory alloy to a temperature greater than or equal to its austenitic transition temperature. Suitable examples of such thermal activation signals that can promote a change in temperature are the use of steam, hot oil, resistive electrical heating, or the like, or a combination comprising at least one of the foregoing signals. A preferred thermal activation signal is one derived from resistive electrical heating.

The active element may also be an electrically active polymer. Electrically active polymers are also commonly known as electroactive polymers (EAP's). The key design feature of devices based on these materials is the use of compliant electrodes that enable polymer films to expand or contract in the in-plane directions in response to applied electric fields or mechanical stresses. When EAP's are used as the active material, strains of greater than or equal to about 100%, pressures greater than or equal to about 50 kilograms/square centimeter ($kg/cm^2$) can be developed in response to an applied voltage. The good electromechanical response of these materials, as well as other characteristics such as good environmental tolerance and long-term durability, make them suitable for active elements under a variety of manufacturing conditions. EAP's are suitable for use as an active element in many latch snug down assembly configurations.

Electroactive polymer-based active elements used in latch snug down assembly may be selected based on one or more material properties such as a high electrical breakdown strength, a low modulus of elasticity—(for large or small deformations), a high dielectric constant, and the like. In one embodiment, a polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The electroactive polymers (EAP's) used herein, are generally conjugated polymers. Suitable examples of EAP's are poly(aniline), substituted poly(aniline)s, polycarbazoles, substituted polycarbazoles, polyindoles, poly(pyrrole)s, substituted poly(pyrrole)s, poly(thiophene)s, substituted poly(thiophene)s, poly(acetylene)s, poly(ethylene dioxythiophene)s, poly(ethylenedioxypyrrole)s, poly(p-phenylene vinylene)s, or the like, or combinations comprising at least one of the foregoing EAP's. Blends or copolymers or composites of the foregoing EAP's may also be used. Similarly blends or copolymers or composites of an EAP with an EAP precursor may also be used.

The active material used in the latch snug down may also comprise a piezoelectric material. Also, in certain embodiments, the piezoelectric material may be configured for providing rapid deployment. As used herein, the term "piezoelectric" is used to describe a material that mechanically deforms (changes shape and/or size) when a voltage potential is applied, or conversely, generates an electrical charge when mechanically deformed. As piezoelectric actuators have a small output stroke, they are usually coupled with a transmission (e.g. a compliant mechanism) that serves to amplify the output stroke at the expense of a reduction in the output force. As an example, a piezoelectric material is disposed on strips of a flexible metal sheet. The piezo actuators are coupled to the sheet in a manner that causes bending or unbending of the sheet when the actuators are activated. The ability of the bending mode of deformation in a flexible shell to amplify small axial strains into larger rotary displacements is used to advantage. The strips can be unimorph or bimorph. Preferably, the strips are bimorph, because bimorphs generally exhibit more displacement than unimorphs.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, polyetherimides ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS, and mixtures thereof.

Shape memory polymers (SMPs) are, most commonly, used to provide means for power-off position holding. Generally, SMP's are co-polymers comprised of at least two different units which may be described as defining different segments within the co-polymer, each segment contributing differently to the elastic modulus properties and thermal transition temperatures of the material. The term "segment" refers to a block, graft, or sequence of the same or similar monomer or oligomer units that are copolymerized with a different segment to form a continuous crosslinked-interpenetrating network of these segments.

These segments may be a combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall elastic modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. The previously defined or permanent shape of the SMP can be set by molding the polymer at a temperature higher than the highest thermal transition temperature for the shape memory polymer or its melting point, followed by cooling below that thermal transition temperature.

In practice, the SMP's are alternated between one of at least two shape orientations such that at least one orientation will provide a size reduction or shape change relative to the other orientation(s) when an appropriate thermal signal is provided. To set a permanent shape, the SMP must be at about or above its melting point or highest transition temperature (also termed "last" transition temperature). The SMP's are shaped at this temperature by blow molding, injection molding, vacuum forming, or the like, or shaped with an applied force followed by cooling to set the permanent shape. The temperature to set the permanent shape is about 40° C. to about 300° C. After expansion, the permanent shape is regained when the applied force is removed, and the SMP formed device is again brought to or above the highest or last transition temperature of the SMP. The Tg of the SMP can be chosen for a particular application by modifying the structure and composition of the polymer. Transition temperatures of suitable SMPs generally range from about −63° C. to above about 160° C.

The temperature desired for permanent shape recovery can be set at any temperature of about −63° C. and about 160° C., or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

The shape memory polymers used in the active device can be thermoplastics, interpenetrating networks, semi-interpenetrating networks, or mixed networks. The polymers can be a single polymer or a blend of polymers. Polymers can be linear, branched, thermoplastic elastomers with side chains or any kind of dendritic structural elements. In one embodiment the shape memory polymer can be a block copolymer, a graft copolymer, a random copolymer or a blend of a polymer with a copolymer.

Stimuli causing shape change can be temperature, ionic change, pH, light, electric field, magnetic field or ultrasound. Suitable polymer components to form a shape memory polymer include polyphosphazenes, polyacrylics, polyalkyds, polystyrenes, polyesters, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbomyl-polyhedral oligomeric silsequioxane), polyvinylchloride, urethane/butadiene copolymers, polyurethane block copolymers, styrene-butadiene-styrene block copolymers, and the like. The polymer used to form the various segments in the SMPs described above are either commercially available or can be synthesized using routine chemistry.

The SMP's may be advantageously reinforced with fillers. Suitable fillers may exist in the form of whiskers, needles, rods, tubes, strands, elongated platelets, lamellar platelets, ellipsoids, micro fibers, nanofibers and nanotubes, elongated fullerenes, and the like.

With reference now to the FIG. 5, the bias spring 22 can comprise a shape memory alloy in its martensitic phase. Activating the shape memory alloy spring via a thermal signal can cause an martensite to austenite phase transformation, which is associated with a restoring force that attempts to revert the shape memory alloy back to its original configuration (in this case, a shorter length for the spring). This causes a further (clockwise) rotation of the latch from the semi-closed position to the fully closed position, and hence, pulls the body 12 closer to the body 14. Once the mechanical interlock for the fully-closed position is engaged, the activation signal to the biasing spring 22 can be removed or discontinued.

Figure 6:
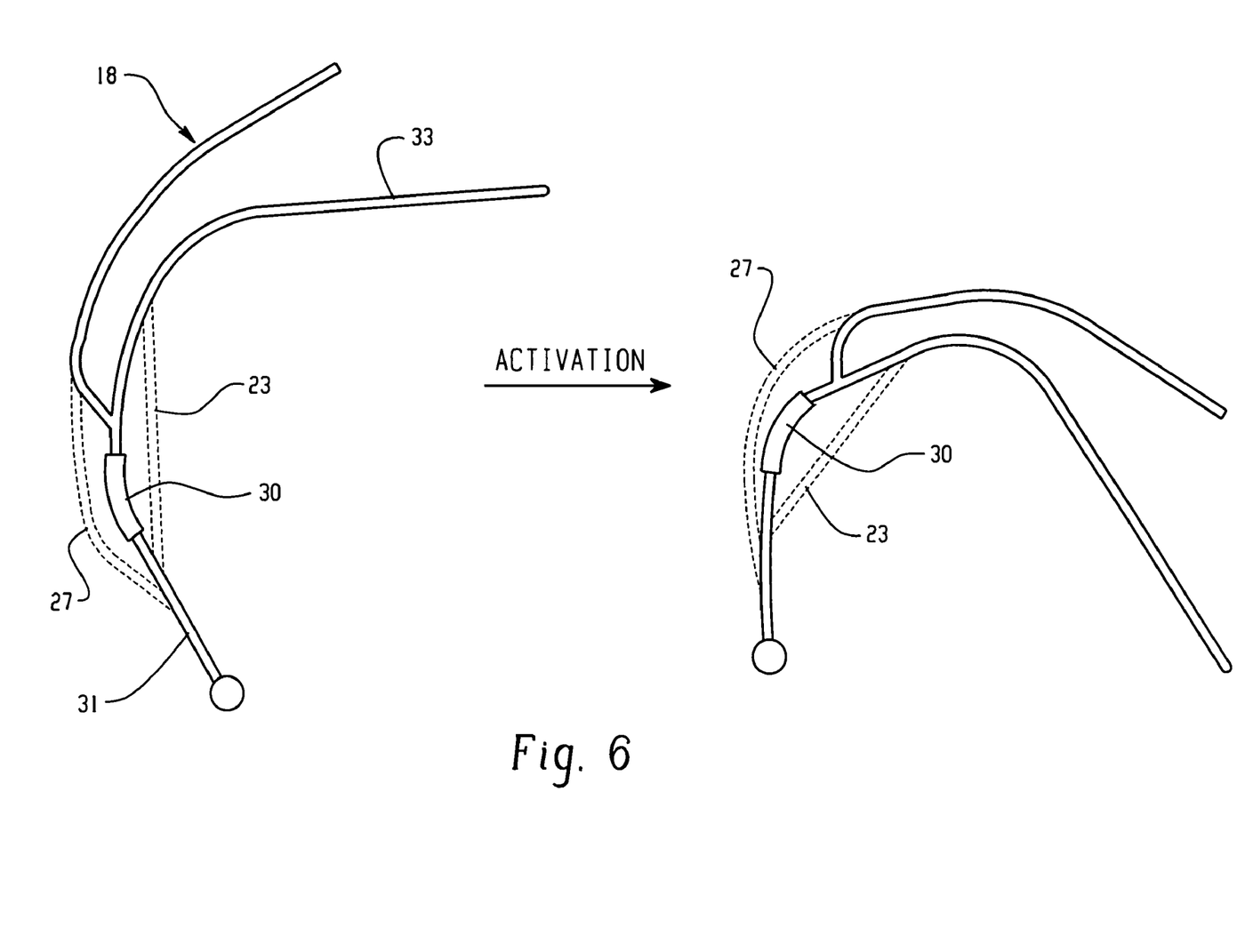
FIG. 6 depicts an exemplary embodiment, wherein the latch comprises two rigid segments 31, 33, in operative communication with a flexible segment 30.

While in one embodiment, the latch is a rigid element, which is fixedly attached to the supporting body, it can also be flexible. The use of a partially flexible latch allows the active material based actuator to be integrated more closely into the latch body. FIG. 6 depicts an exemplary embodiment, wherein the latch comprises two rigid segments 31, 33, connected by a flexible segment 30. Upon activation, the actuator 23 generates a force (or torque) that causes the latch body to bend at the flexible segment 30 as shown in the FIG. 6. The bending at the flexible segment drives the latch into its fully-closed position, where a mechanical interlock (not shown) can be engaged to hold position even after the activating signal is turned off.

The actuator 23 may comprise one or more elements that can be positioned in many different ways, including ways in which the actuator is completely embedded or concealed in the latch body. The elastic energy stored in the flexible segment 30 can be used to release the latch on request. Similarly, one or more auxiliary actuators 27, which provides a force opposed to the actuating force provided by the linear actuator 23, can be used to restore the latch to its original position (e.g. to aid the latch release). The latch can comprise the flexible segment from about 10 to about 100 weight percent, based on the weight of the latch.

Figure 7:
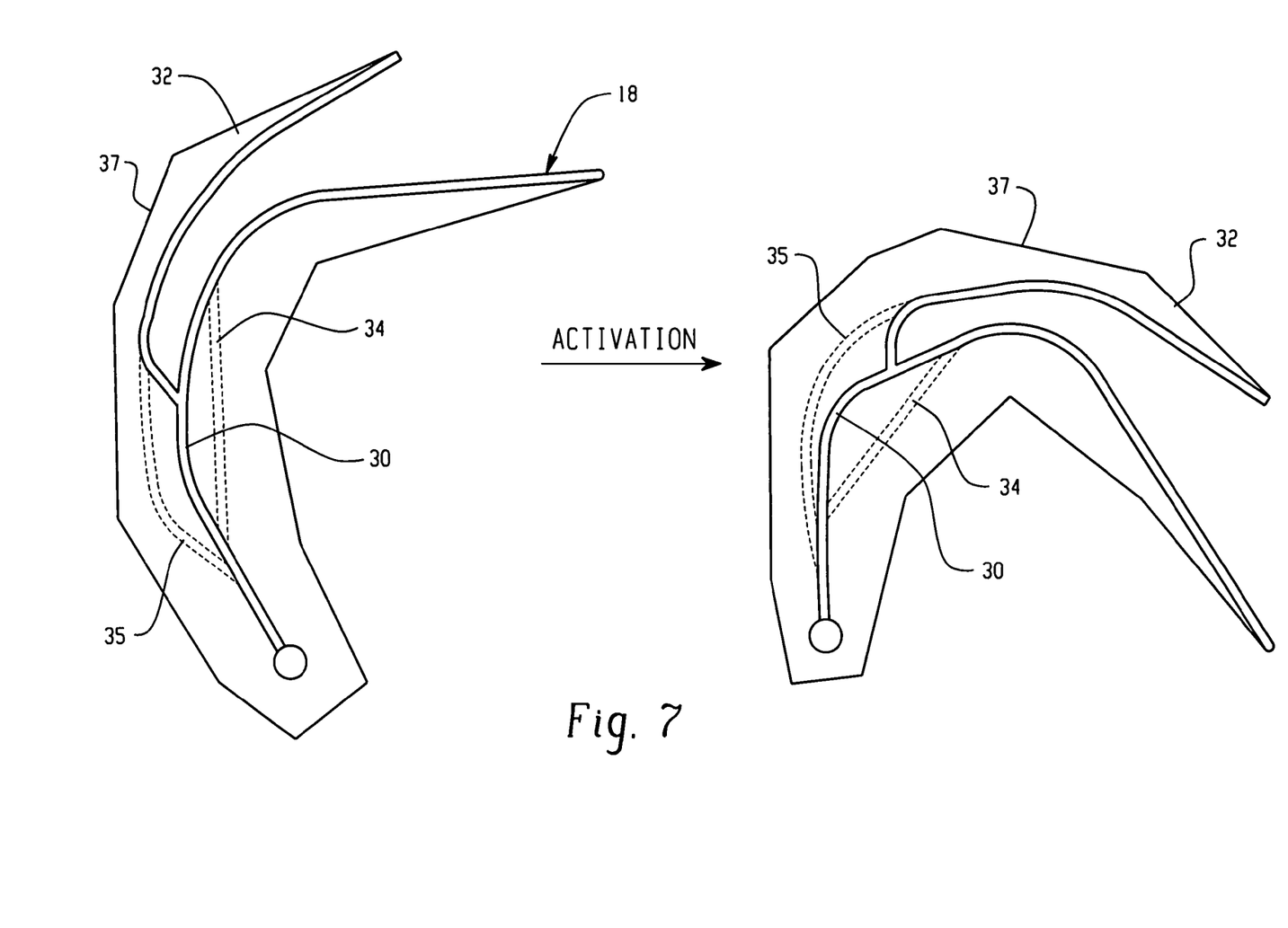
FIG. 7 depicts an exemplary embodiment wherein the frame (or skeleton) of the latch body comprises two segments, a variable stiffness segment 32 and a flexible segment 30.

In another embodiment, depicted in the FIG. 7, the latch can be manufactured from a composite of a shape memory polymer (SMP) and an elastic material (e.g. spring steel) with a active material based actuator (e.g., SMA) embedded therein. Latches made from such composites display an ability to hold the fully-closed position without the use of any additional mechanical interlocking after the latch snug down is complete.

In this embodiment, as depicted in the FIG. 7, the frame (or skeleton) of the latch body comprises two segments, a rigid segment 32 and a flexible segment 30. The rigid segment 32, which engages the striker 16 comprises a wear resistant material (e.g., a metal), while the flexible segment 30, comprises an elastic material (e.g., spring steel, austenitic shape memory alloy, or the like). At least a portion of the frame is embedded in and mechanically coupled to a shape memory polymer matrix 33. The shape memory polymer has a characteristic temperature known as its glass transition temperature (Tg), such that the elastic modulus of the material drops significantly (e.g., a factor of about 30 to about 150) when it is heated above its Tg. The shape memory polymer is a soft and easily pliable polymer above the Tg, and it can be deformed significantly (e.g. up to 200% recoverable strain) by a relatively low force. On cooling the deformed shape memory polymer below its Tg, the material reverts back to its stiffer form, while retaining the deformed shape in a stress-free condition. If a specified limiting temperature is not exceeded during the heating process, the aforementioned procedure comprising heating, deforming and cooling can be repeated multiple times. Elements that serve to heat and/or cool the shape memory polymer are a part of the composite latch body, but are not shown in the FIG. 7.

As detailed above, active material based actuators 34 can be embedded in the shape memory polymer matrix. The actuators 34 induce the latch body to bend as upon activation when the shape memory polymer is below its Tg. The bending moment applied by the actuator is operative in the region comprising the flexible portion of the skeleton. This bending moment assists in the latch snug-down operation and active sealing of the enclosure. Auxiliary actuators 35 can also be embedded in the shape memory polymer matrix to facilitate the bending moment.

During latch snug-down operation, the actuators have to overcome the elastic resistance of the flexible segment and the shape memory polymer matrix, in addition to the elastic resistance of the seals, in order to assist in and/or accomplish the snug-down. Once the latch is in the fully closed position, the shape memory polymer is cooled below its Tg, whereupon it reverts to its high modulus state. The high stiffness of the SMP matrix of the latch body when the SMP is cooled below its Tg, ensures that the latch is held in the fully-closed position even after the actuator elements are powered off.

The use of a bias spring (as depicted in the FIG. 3) and the changed configuration of the latch upon activation ensure locking of the latch body in the fully-closed position, thereby eliminating the need for an external interlock. When the latch is to be released, the shape memory polymer is heated above its Tg to soften it. As the actuators are in an unactivated state, they do not exert a force to bend the latch body. Hence, the strain energy stored in the latch body and seals during the snug-down part of the sealing process, serves to revert the latch body to its original shape. Auxiliary actuators 35 can be activated to assist this task.

Figure 8:
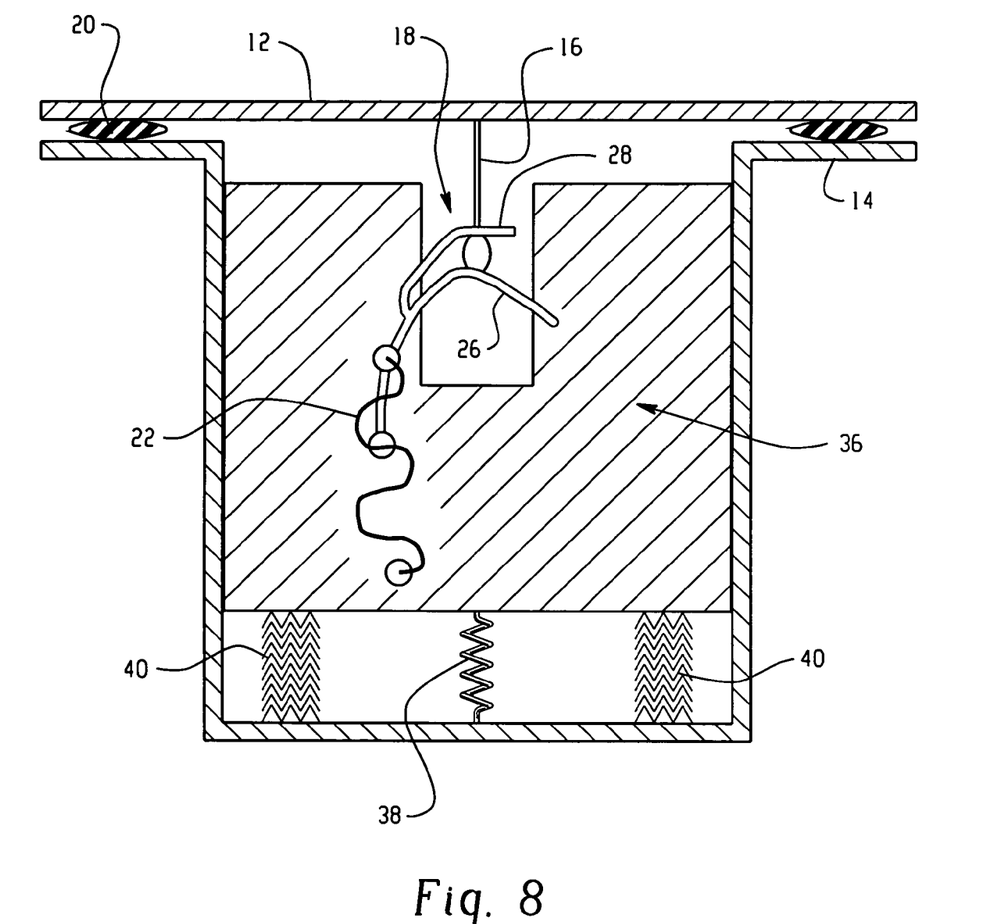
FIG. 8 depicts an exemplary embodiment of a latch body comprising a sub-assembly 36 that comprises a second biasing spring 38 and an actuator 40.

In yet another embodiment related to latch snug down, a sub-assembly 36 that is mobile with respect to the rest of the latch body, which is fixed to the supporting body 14, is shown in the FIG. 8. In the FIG. 8, a sub assembly 36 is in operative communication with the rest of the latch body, and hence, the supporting body 14 through a second bias spring 38 and secondary actuators 40. The second bias spring 38 is designed to maintain the sub-assembly 36 in a position suitable for interlocking and to support the sub-assembly 36 during the interlocking. The secondary actuators 40 can comprise active materials (e.g. shape memory alloy elements, electroactive polymer elements, or the like), and serve to draw the sub-assembly 36 closer to the supporting body 14 during the latch snug-down process. Thus, the actuators 40 have to work against the elastic resistance offered by the second bias spring 38 in addition to that offered by the seals. Once the latch is in its fully-closed position, as shown in FIG. 8, other locking mechanisms (e.g. pull pin, ratchet, etc) may be used to secure that position even after the actuators have been powered off. To unlatch, the above locking mechanisms are disengaged, whereupon the strain energy stored in the second bias spring 38 and in the seals will reverse the snug-down part of the latching process. Additional actuators may be used to reverse the first step. In one embodiment, the second bias spring 38, the actuator and the locking mechanism can all be combined into a single composite structure in a manner that is conceptually similar to that depicted in FIG. 7. In addition, the motion of the sub-assembly 36 can be guided by constraints if desired. The actuators 40 may be augmented by other actuators that are placed between the suspended body 12 and the supporting body 14.

In another embodiment, a signal to displace the suspended body can be used to activate auxiliary actuators and/or the mechanical energy stored in the various compliant members of the latch sub-assembly to release the various mechanical interlocks and thereby, allow the suspended body to be separated from the supporting body.

As noted above, the use of active materials in a snug down process is advantageous because of the reduction in moving parts. In general, latch snug down that is accomplished by using active materials are lighter, less bulky, quieter, and more reliable that other systems that employ motors to accomplish good sealing between the suspended body and the supporting body in an enclosure.

Many variations of this basic idea that lead to similar results, are possible e.g. the latch may be attached to the vehicle body and the striker to the vehicle body, different type and number of actuators may be used, different locking mechanisms to hold the closure in its final (i.e., snug-down) position may be used including those based on the use of smart/active materials.

The active seals disclosed herein can be advantageously utilized in automobile doors, aircraft doors, and other vehicles where light weight, reliable seals are desirable. The seals can also be advantageously used in elevators, refrigerators, residential and office buildings, or the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A locking arrangement including a locking device in combination with a suspended body for locking the suspended body to a supporting body, comprising:
    a striker disposed on the suspended body; and
    a rotatable latch disposed on the supporting body having a first finger and a second finger, each of the fingers having a respective convex side and a respective concave side opposite the convex side;
    wherein the concave side of the first finger faces the convex side of the second finger;
    the striker being positioned to initially contact the concave side of the second finger upon closure of the suspended body relative to the supporting body and effect rotation of the rotatable latch such that the first finger forms a mechanical interlock with the striker;
    wherein the latch is in operative communication with an active material based actuator that comprises an active material;
    wherein the fingers are rigid and the rotatable latch includes a rigid segment and a flexible segment, wherein the flexible segment is disposed between the fingers and the rigid segment such that the rotatable latch bends at the flexible segment in response to application of a force to the rotatable latch;
    wherein the active material based actuator is adapted to rotate the first finger and exert a force against the striker in response to an applied activation signal to the active material and effect further closure of the locking device.

2. The locking arrangement of claim 1, wherein the active material comprises a shape memory alloy, a shape memory polymer, a magnetorheological fluid, an electrorheological fluid, a electroactive polymer, or a combination comprising at least one of the foregoing shape memory materials.

3. The locking arrangement of claim 1, wherein the active material is activated by the application of an external stimulus, wherein the external stimulus is electrical, magnetic, thermal, mechanical, chemical, or a combination comprising at least one of the foregoing external stimuli.

4. The locking arrangement of claim 1, wherein the active material is configured to change its shape, stiffness and/or dimensions in response to an applied external stimulus.

5. The locking arrangement of claim 1, further comprising a biasing spring in operative communication with the locking device.

6. The locking arrangement of claim 1, further comprising a controller in operative communication with the locking device.

7. The locking arrangement of claim 1, wherein the rotatable latch is coupled to a movable sub-assembly that comprises a biasing spring and a secondary actuator, wherein the sub-assembly is operative to reduce a distance between the suspended body and the supporting body.

8. The locking arrangement of claim 1, wherein the active material based actuator is operatively coupled to at least one of the fingers to bend the rotatable latch at the flexible segment to move the fingers relative to the rigid segment in response to activation of the active material based actuator.

9. The locking arrangement of claim 1, further comprising a bias spring interconnecting the rotatable latch and the supporting body with the bias spring for biasing the rotatable latch to a first equilibrium position to receive the striker between the first and second fingers and for biasing the rotatable latch to a second equilibrium position to retain the striker by the first finger.

10. A method for assisting a final closing motion of a suspended body with respect to a supporting body comprising:

moving the suspended body to within a defined distance from the supporting body and contacting a striker to provide a mechanical interlock between the suspended body and the striker, wherein the striker is fixedly attached to the supporting body; and applying an activation signal to an active material of an active material actuator to bend a rotatable latch at a flexible segment that interconnects at least one finger of the rotatable latch and a rigid segment of the rotatable latch to move the at least one fingers of the rotatable latch relative to the rigid segment such that the at least one finger exerts a force against the striker, thereby moving the suspended body to a final closed position from the defined distance.

11. The method of claim 10, wherein the active material comprises a shape memory alloy, a shape memory polymer, a magnetorheological fluid, an electrorheological fluid, a electroactive polymer, or a combination comprising at least one of the foregoing shape memory materials.

12. The method of claim 10, wherein the active material is activated by the application of an external stimulus, wherein the external stimulus is electrical, magnetic, thermal, mechanical, chemical, or a combination comprising at least one of the foregoing external stimuli.

13. The method of claim 10, wherein the active material is configured to change its shape, stiffness and/or dimensions in response to an applied external stimulus.

14. The method of claim 10, wherein the rotatable latch includes a flexible segment interconnecting the rigid segment and the fingers; and wherein said applying an activation signal to an active material causes the flexible segment to bend.

15. A locking arrangement including a locking device in combination with a suspended body for locking the suspended body to a supporting body, comprising:

a rotatable latch disposed on the supporting body with the rotatable latch having first and second fingers, a striker disposed on the suspended body with the striker being positioned to initially contact the second finger upon closure of the suspended body relative to the supporting body and effect rotation of the rotatable latch such that the first finger forms a mechanical interlock with the striker;

the rotatable latch including a rigid segment and a flexible segment with the flexible segment connecting the rigid segment and the fingers such that the fingers are rotatable relative to the rigid segment; and an active material based actuator that comprises an active material operatively connected to at least one of the upper and lower fingers to move the fingers relative to the rigid segment and exert a force against the striker in response to an applied activation signal and effect further closure of the locking device.

16. A locking arrangement including a locking device in combination with a suspended body for locking the suspended body to a supporting body, comprising:

a striker disposed on the suspended body; and a rotatable latch disposed on the supporting body having a first finger and a second finger, each of the fingers having a respective convex side and a respective concave side opposite the convex side;

wherein the concave side of the first finger faces the convex side of the second finger;

the striker being positioned to initially contact the second finger upon closure of the suspended body relative to the supporting body and effect rotation of the rotatable latch such that the first finger forms a mechanical interlock with the striker;

wherein the latch is in operative communication with an active material based actuator that comprises an active material;

wherein the active material based actuator is adapted to rotate the first finger and exert a force against the striker in response to an applied activation signal to the active material and effect further closure of the locking device;

wherein the rotatable latch is coupled to a movable sub-assembly that comprises a biasing spring and a secondary actuator, wherein the sub-assembly is operative to reduce a distance between the suspended body and the supporting body.

* * * * *